Patented Jan. 23, 1951

2,538,847

UNITED STATES PATENT OFFICE 2,538,847

RECOVERY OF STREPTOMYCIN FROM FERMENTATION BROTHS

Peter P. Regna, West New York, N. J., and Isaiah A. Solomons, III, Jackson Heights, N. Y., assignors to Chas. Pfizer & Co., Inc., Brooklyn, N. Y., a corporation of New Jersey No Drawing. Application April 23, 1947, Serial No. 743,456

2 Claims. (Cl. 260—185)

This invention relates to the recovery of streptomycin from crude aqueous solutions of same, such as fermentation broths, and it has for its object to provide a novel and improved process for this purpose.

Another object of the invention is to provide a simple and economical method of precipitating streptomycin from fermentation broths in the form of a dye salt.

Still another object is to prepare a novel dye salt of streptomycin which is useful in the preparation of other commercial streptomycin salts of high antibiotic activity.

Various other objects and advantages will be apparent as the nature of the invention is more fully disclosed.

Streptomycin, an antibiotic produced by cultures of Streptomyces griseus, is a highly potent antibacterial agent which is effective against a wide variety of pathogenic organisms. Clinical indications for the use of streptomycin have been observed in urinary tract infections, due to gram negative microorganisms, influenza bacillus, meningitis, tracheobronchitis and pneumonia, tularemia, ophthalmic infections due to Ps. pyocyaneus, peritonitis due to gram negative organisms, and certain gram negative bacillary infections. Promising results have been obtained also in studies of tuberculosis.

It is known to adsorb streptomycin or its salts from solutions upon activated carbon, and to elute it therefrom with solvents adjusted to a pH below neutral, but this procedure yields streptomycin along with much extraneous material since many other substances are simultaneously adsorbed and eluted. For this reason this method gives a product of low potency. It is also possible to prepare streptomycin concentrates by adsorption on zeolites or ion-exchange resins. However, in removing the streptomycin from these adsorbents by sodium or potassium chlorides, the streptomycin becomes contaminated with considerable amounts of these salts which are difficult to remove, and even after separation of the inorganic salts gives concentrates with a low streptomycin potency.

We have now discovered a novel method for the recovery of streptomycin directly from fermentation broths and partially-purified solutions by combining the streptomycin and similar basic compounds which are present in the fermentation broth with the disodium salt of 8-amino-7-p-nitrophenylazo-2-phenylazo-1-naphthol-3,6-disulfonic acid, also known as Naphthol Blue-Black (Color Index #246), the structural formula of which is:

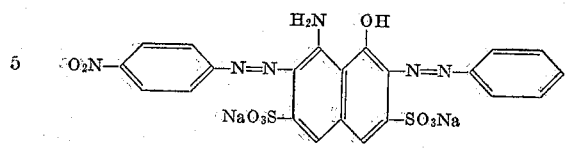

Although the broth can be treated with the above dye at any pH, within pH 2 to 10 (outside these limits of hydrogen ion concentration, streptomycin is not stable; see "Stability of Streptomycin" by Regna, Wasselle and Solomons, J. Biol. Chem., vol. 165, p. 631 (1946)), for best results we prefer to carry out the precipitation at about pH 5.5.

No generalizations can be made which correlate the structure of dyes with the insolubility of their streptomycin salts. In the case of the present invention, the Naphthol Blue-Black dye produces a very insoluble streptomycin salt. The required quantity of dye depends upon the concentration of streptomycin in the broth, and this may be determined by adding increasing amounts of the disodium salt of 8-amino-7-p-nitrophenylazo-2-phenylazo-1-naphthol-3,6-disulfonic acid to small samples of the fermentation broth until the maximum precipitation of streptomycin for the minimum amount of dye is established. This is done by filtering the streptomycin-Naphthol Blue-Black precipitates and assaying the filtrates by microbiological methods using Escherichia coli and Bacillus subtilis similar to those employed for penicillin assays. The B. subtilis plate assay was carried out by the method of Schmidt and Moyer (J. Bact., vol. 47, p. 199 (1944)), and the E. coli turbidimetric assay by the procedure of McMahan (J. Biol. Chem., vol. 153, p. 249 (1944)).

The fermentation broth referred to in the following examples may be produced by a strain of Streptomyces griseus grown on media containing 1% glucose, 0.5% peptone, 1.2% corn steep liquor and 0.5% sodium chloride, and on modifications of these media.

Example 1

A streptomycin fermentation broth was filtered from the mycelium and the filtrate (1 liter: 110,000 mcg.) was adjusted to pH 5.4 with sulfuric acid, and to it was added 7 g. of supercel (the large amount of filter aid is not necessary for purposes of aiding the filtration, but is a means of keeping the precipitate well-dispersed in the subsequent conversion of the streptomycin-Naphthol Blue-Black salt to streptomycin trihydrochloride, as disclosed and claimed in our copending application Serial No. 748,129, filed May 14, 1947) and 2.5 g. of Naphthol Blue-Black. This was stirred for one-half hour and filtered. The filtrate contained 10 mcg./ml. (8.5%). The precipitate was dried and a portion was dissolved in 1:1 methyl Cellosolve-water mixture and filtered from the supercel. After correcting for the contents of the supercel, the material when assayed against the Food and Drug Administration working standard gave 185 mcg./mg. by the *B. subtilis* agar plate method and 230 mcg./mg. by the *E. coli* turbidimetric method which on the basis of streptomycin sulfate is equivalent to 450 mcg./mg.

Example 2

To 1 liter (130,000 mcg.) of a filtered streptomycin fermentation broth at pH 7.5 was added 12 g. of Norit A, stirred one hour and filtered over a supercel pre-coated filter. The carbon adsorbate was suspended in 100 ml. of 0.1 N HCl and stirred for one-half hour. The carbon adsorbate was again eluted with 50 ml. of 0.1 N HCl by stirring for one-half hour. The combined eluates were neutralized with sodium hydroxide to pH 5.5 and refiltered. To the filtrate was added 4 g. of supercel and 3 g. of a Naphthol Blue-Black. The mixture was stirred for one hour and filtered; the filtrate contained 24 mcg./ml. which was discarded. The streptomycin-Naphthol Blue-Black salt was dried and a weighed portion was dissolved in 1:1 methyl Cellosolve-water mixture and filtered from the supercel. After correcting for the excess supercel, the material when assayed against the Food and Drug Administration working standard gave an average of 310 mcg./mg. using the *B. subtilis* agar plate and the *E. coli* turbidimetric methods which on the basis of streptomycin sulfate is equivalent to 610 mcg./mg.

Example 3

To 1 liter (139,000 mcg.) of a filtered streptomycin fermentation broth at pH 5.6 was added 7 g. of supercel and 5 g. of Naphthol Blue-Black. This was stirred for one hour and filtered. The filtrate contained 30 mcg./ml. The precipitate was dried and a portion was dissolved in 1:1 methyl Cellosolve-water mixture and filtered from the supercel. After correcting for the excess supercel, the material when assayed against the Food and Drug Administration working standard gave an average of 280 mcg./mg. using the *B. subtilis* agar and the *E. coli* turbidimetric methods which on the basis of streptomycin sulfate is equivalent to 560 mcg./mg.

The invention claimed is:

1. Method of recovering a streptomycin salt from a clarified streptomycin fermentation broth which comprises treating said broth at a pH of 2 to 10 with the disodium salt of 8-amino-7-p-nitrophenylazo-2-phenylazo-1-naphthol-3,6-disulfonic acid, to precipitate a streptomycin salt of said disulfonic acid.

2. Method of recovering a streptomycin salt from a clarified streptomycin fermentation broth which comprises adjusting said broth to about pH 5.5 and treating said broth with the disodium salt of 8-amino-7-p-nitrophenylazo-2-phenylazo-1-naphthol-3,6-disulfonic acid, to precipitate a streptomycin salt of said disulfonic acid.

PETER P. REGNA.
ISAIAH A. SOLOMONS, III.

REFERENCES CITED

The following references are of record in the file of this patent:

UNITED STATES PATENTS

| Number | Name | Date |
| --- | --- | --- |
| 1,674,128 | Rose | June 19, 1928 |
| 1,860,036 | Kranzlem et al. | May 24, 1932 |
| 2,022,678 | Kritchevsky et al. | Dec. 3, 1935 |
| 2,462,175 | Folkers | Feb. 22, 1949 |

OTHER REFERENCES

Kuehl et al.: Science, vol. 102 (1945), pages 34–35, 2 pages.